(12) United States Patent
Takeda

(10) Patent No.: US 6,917,283 B2
(45) Date of Patent: Jul. 12, 2005

(54) BICYCLE COMPUTER CONTROL ARRANGEMENT AND METHOD

(75) Inventor: Kazuhiro Takeda, Osaka (JP)

(73) Assignee: Shimano, Inc., Osaka (JP)

(*) Notice: Subject to any disclaimer, the term of this patent is extended or adjusted under 35 U.S.C. 154(b) by 0 days.

(21) Appl. No.: 10/867,403

(22) Filed: Jun. 14, 2004

(65) Prior Publication Data
US 2004/0239489 A1 Dec. 2, 2004

Related U.S. Application Data

(63) Continuation of application No. 10/205,330, filed on Jul. 24, 2002, now Pat. No. 6,781,510.

(51) Int. Cl.[7] .................................................. B62J 3/00
(52) U.S. Cl. ........................ 340/432; 340/439; 340/441
(58) Field of Search ........................ 340/309.16, 309.3, 340/309.4, 309.7, 432, 435, 438, 439, 441; 280/238, 260, 261; 200/4; 474/70

(56) References Cited

U.S. PATENT DOCUMENTS

| 4,071,892 A | 1/1978 | Genzling | 701/200 |
|---|---|---|---|
| 4,490,127 A | 12/1984 | Matsumoto et al. | 474/110 |
| 5,254,044 A | 10/1993 | Anderson | 474/70 |
| 5,370,412 A | 12/1994 | Chou | 280/288.4 |
| 5,621,382 A | 4/1997 | Yamamoto | 340/432 |
| 5,625,336 A | 4/1997 | Yamamoto | 340/432 |
| 5,967,937 A | 10/1999 | Matsuo | 475/297 |
| 6,073,730 A | 6/2000 | Abe | 188/24.11 |
| 6,192,300 B1 * | 2/2001 | Watarai et al. | 701/1 |
| 6,204,752 B1 | 3/2001 | Kishimoto | 340/432 |
| 6,367,833 B1 | 4/2002 | Horiuchi | 280/260 |
| 6,619,154 B2 | 9/2003 | Campagnolo | 74/502.2 |
| 6,682,087 B1 | 1/2004 | Takeda | 280/238 |
| 6,734,376 B2 * | 5/2004 | Ichida et al. | 200/4 |

OTHER PUBLICATIONS

Molding the Future, 2 pages, with English description.

* cited by examiner

*Primary Examiner*—Van T. Trieu
(74) *Attorney, Agent, or Firm*—Knobbe, Martens, Olson & Bear, LLP

(57) ABSTRACT

A control system for an automatic shifting bicycle transmission includes a control unit, a display device and a remote switch assembly. The remote switch assembly is positioned close to a handgrip location. The remote switch assembly is used to shift gears when the bicycle is manually operated and to control data entry and review.

17 Claims, 7 Drawing Sheets

BICYCLE COMPUTER CONTROL ARRANGEMENT AND METHOD

PRIORITY INFORMATION

The present application is a continuation of U.S. patent application No. 10/205,330, filed Jul. 24, 2002 now U.S. Pat. No. 6,781,510, the entire contents of which is hereby expressly incorporated by reference.

BACKGROUND OF THE INVENTION

1. Field of the Invention

The present invention generally relates to bicycles having automatically shiftable transmissions operated by a control unit. More particularly, the present invention relates to such bicycles and a method of controlling the control unit and its associated display with at least one switch that is mounted remotely from the control unit and its associated display.

2. Description of the Related Art

Bicycles are being equipped with increasingly sophisticated equipment. One type of bicycle now has an automatically shifting transmission. To control the shift timing, the bicycle is provided with a control unit. The control unit, in addition to controlling shifting, also can track and/or calculate distances, time, bicycle speed and the like. The values that are tracked and/or calculated then can be displayed on a screen. This information is useful to the serious bicyclist who uses the information during training and to the recreational bicyclist who can track distance traveled, speed and time spent bicycling.

U.S. Pat. No. 5,370,412, issued on Dec. 6, 1994, to Ming-Fu Chou, disclosed a bicycle meter assembly that had a separate body portion and a keypad. The keypad was installed on a handlebar of the bicycle substantially adjacent to a handgrip while the body portion was installed substantially near a middle of the handlebar. Thus, the bicyclist was able to operate the keypad without removing his or her hand from the handle grip. The keypad was provided for controlling the display modes of the meter. The operator could not, however, effect any changes to stored data with the keypad.

U.S. Pat. No. 5,254,044, issued on Oct. 19, 1993, to Paul M. Anderson, disclosed an automatically shifting bicycle having a display that could be mounted to a handlebar. The display was connected to a microprocessor and a pair of switches also was connected to the microprocessor. The pair of switches was mounted to the handlebar. One switch was used to increase upper and lower limits of shifting speeds and the other switch was used to decrease the same upper and lower limits of shifting speeds. The switches did not adjust the display but only manipulated the shifting speed limits. A set up switch was provided to alter various values stored in memory. The location of the set up switch was not disclosed, however.

SUMMARY OF THE INVENTION

Even with these arrangements, however, bicycles were limited to paging through various screens and information. Bicyclists were required to remove their hands from the handlebars in order to input data values or otherwise manipulate information stored in the control unit of a computer. Accordingly, an arrangement is provided in accordance with one feature of the present invention by which a switch or pushbutton mounted remotely relative to a display screen of a computer and to a control unit of the computer allows a user to manipulate information stored on the computer in addition to paging through various screens of information. For instance, data can be entered and stored for use by the computer through the manipulation of the remote switches.

Furthermore, with the proliferation of computer components that can be mounted to bicycles, the complexity of the bicycle is bound to increase. For instance, a number of additional buttons that require manipulation to control various features of the bicycle and/or computer can be envisioned. These additional buttons or switches then make the bicycle less user friendly and more difficult to operate. Accordingly, another feature of the present invention is to integrate operation of a computer with operation of another component of the bicycle. For instance, automatic shifting bicycle transmissions usually employ up shift and down shift switches. These switches are used in one configuration to control data entry and information review.

Accordingly, one aspect of the present invention involves a method of controlling a control unit of a bicycle. The bicycle comprises a first switch, a second switch, a third switch and a screen in communication with the control unit. The second switch and the third switch are remotely positioned relative to the screen and each of the first switch, the second switch and the third switch are in communication with the control unit. The method comprises selecting a value setting mode with said first switch and altering a value on said screen with at least one of said second switch and said third switch.

Another aspect of the present invention involves a method of controlling a control unit of a bicycle. The bicycle comprises a first switch, a second switch and a screen in communication with the control unit. The first switch and the second switch are remotely positioned relative to the screen and each of the first switch and the second switch are in communication with the control unit. The method comprises selecting a value setting mode with at least one of the first remotely positioned switch and the second remotely positioned switch and altering a value on the screen with at least one of the first remotely positioned switch and the second remotely positioned switch.

A further aspect of the present invention involves an electrical auto-shift bicycle comprising a control unit and a powered shifting device. The control unit is in electrical communication with the powered shifting device. A first switch and a second switch are remotely positioned relative to the control unit and are in communication with the powered shifting device. A mode switch is in electrical communication with the control unit. The mode switch is adapted to switch the control unit between a viewing mode and a data entry mode. The first switch and the second switch are adapted to initiate movement of the powered shifting device. At least one of the first switch and the second switch is adapted to select a display output from the control unit and is adapted to alter a value stored in memory of the control unit.

Another aspect of the present invention involves a method of controlling a control unit of a bicycle. The bicycle comprising a first switch, a second switch, a third switch and a screen in communication with the control unit. The first switch, the second switch and the third switch are integrated into a housing containing the screen and the control unit. Each of the first switch, the second switch and the third switch are in communication with the control unit. A first powered shifting device is in electrical communication with the control unit and a second powered shifting device is in electrical communication with the control unit. The method of controlling comprises selecting a value setting mode with the first switch, altering a value on the screen with at least one of the second switch and the third switch, controlling the first powered shifting device with the second switch and controlling the second powered shifting device with the third switch.

BRIEF DESCRIPTION OF THE DRAWINGS

These and other features, aspects and advantages of the present invention will now be described with reference to the drawings of preferred embodiments which are intended to illustrate and not to limit the invention. The drawings comprise eight figures.

DETAILED DESCRIPTION OF THE PREFERRED EMBODIMENT

Figure 1:
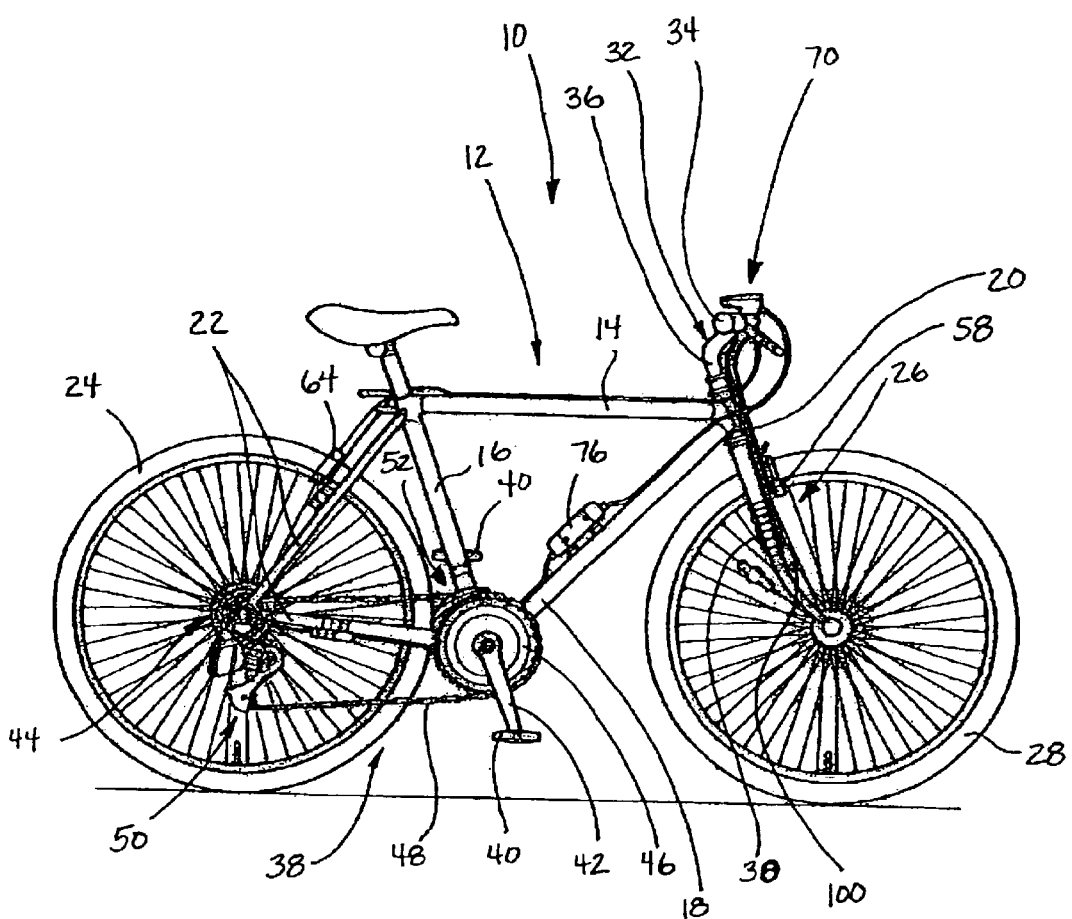
FIG. 1 is a side elevation view of a bicycle having a control system arranged and configured in accordance with the present invention.

With reference now to FIG. 1, a bicycle is illustrated therein. The bicycle is identified by the reference numeral 10. The illustrated bicycle 10 will provide an exemplary environment in which a control system arranged and configured in accordance with certain features, aspects and advantages of the present invention can be used. Of course, there are many other types of bicycles and other human-powered vehicles with which a control system arranged and configured in accordance with certain features, aspects and advantages of the present invention can be used. Accordingly, while the present control system will be described in the context of the illustrated bicycle, it should be understood that various features, aspects and advantages of the present control system also could be used in other environments.

The illustrated bicycle 10 comprises a welded-up frame assembly 12, such as those well-known in the art. In general, the frame assembly 12 comprises a cross tube 14, a seat pillar tube 16 and a down tube 18. A head pipe 20 joins a forward end of the cross tube 14 and the down tube 18. A pair of stays 22 extends rearward from the seat pillar tube 16 and cooperate to support a rear wheel 24. In some arrangements, a suspension system can be provided by which the rear wheel 24 is suspended relative to the frame assembly and road shocks can be somewhat absorbed. While the illustrated frame assembly is one style of frame assembly 12, other designs are possible and known at the present time. Any suitable style of frame assembly 12 can be used.

A front fork assembly 26 is pivotally mounted to the head pipe 20 or any other suitable forward portion of the frame assembly 12. A front wheel 28 is rotatably supported within the front fork assembly 14. The front fork assembly 26 can comprise a suspension component 30, such as a shock absorber, for instance. Any other suitable suspension component 30 can be used. In one particularly preferred arrangement, the suspension component 30 comprises a mechanically alterable assembly that allows an operator to adjust the stiffness of the suspension component. In one advantageous embodiment, the suspension component 30 can be selectively moved between a stiffer configuration and a softer configuration.

The front wheel 28 can be steered through a handle bar assembly 32. The handle bar assembly 32 generally comprises a handle bar 34 and a stem 36 (see FIG. 2) that is secured to the front fork assembly 26. While the illustrated handle bar 34 is generally straight, other suitable handle bar configurations also can be used. For instance, the handle bars 18 can bend upward and forward, upward and rearward, downward and forward, downward and rearward, upward and inward, upward and outward, downward and inward or downward and outward.

The rear wheel can be powered through a suitable transmission 38 by power input through pedals 40 mounted to associated crank arms 42. The suitable transmission 38 can be a chain drive or a shaft drive. The transmission 38 preferably includes a change speed feature in which the transmission 38 can be shifted through a variety of gear steps. Such transmissions are well known in the art and can include external arrangements (i.e., sprockets) and internal arrangements (i.e., internal gear hubs).

In the illustrated arrangement, a rear sprocket set 44 is mounted to the hub of the rear wheel 24. The rear sprocket set 44 can include a number of gear steps that are defined by varied tooth numbers. In one configuration, the rear sprocket set 44 can include three gear steps. In another configuration, the rear sprocket set 44 can include eight gear steps and the tooth numbers can vary from 11 to 33. Any number of gear steps can be used as suited to the particular application.

The illustrated arrangement also features a front sprocket set 46. The front sprocket set 46 preferably is connected to the crank arms 42. As used herein, "set" can refer to one or more than one. Accordingly, in some arrangements, the front sprocket set 46 comprises a single front sprocket. In other arrangements, the front sprocket set 46 comprises a double or triple front sprocket. A presently preferred front sprocket set 46 comprises a dual front sprocket featuring 34 and 46 teeth, respectively. The front sprocket set 32 and the rear sprocket set 30 are connected with a roller chain 48 in the illustrated arrangement. In this manner, rotation of the crank arms 42 can be transferred to the rear wheel 24.

Shifting of the illustrated transmission 38 preferably is accomplished using actuator-controlled derailleurs. A rear shifting device 50 is used to shift among the gear steps on the rear sprocket set 44 and a front shifting device 52 is used to shift between the gear steps on the front sprocket set 46. The shifting devices 50, 52 can comprise a motorized actuator, a solenoid-type actuator or any other suitable powered actuator. Several such actuators are known in the art. The shifting devices 50, 52 move the associated derailleur from gear step to gear step as desired. A position sensor (not shown) can be associated with each shifting device 50, 52 to monitor the position of the derailleur.

Figure 2:
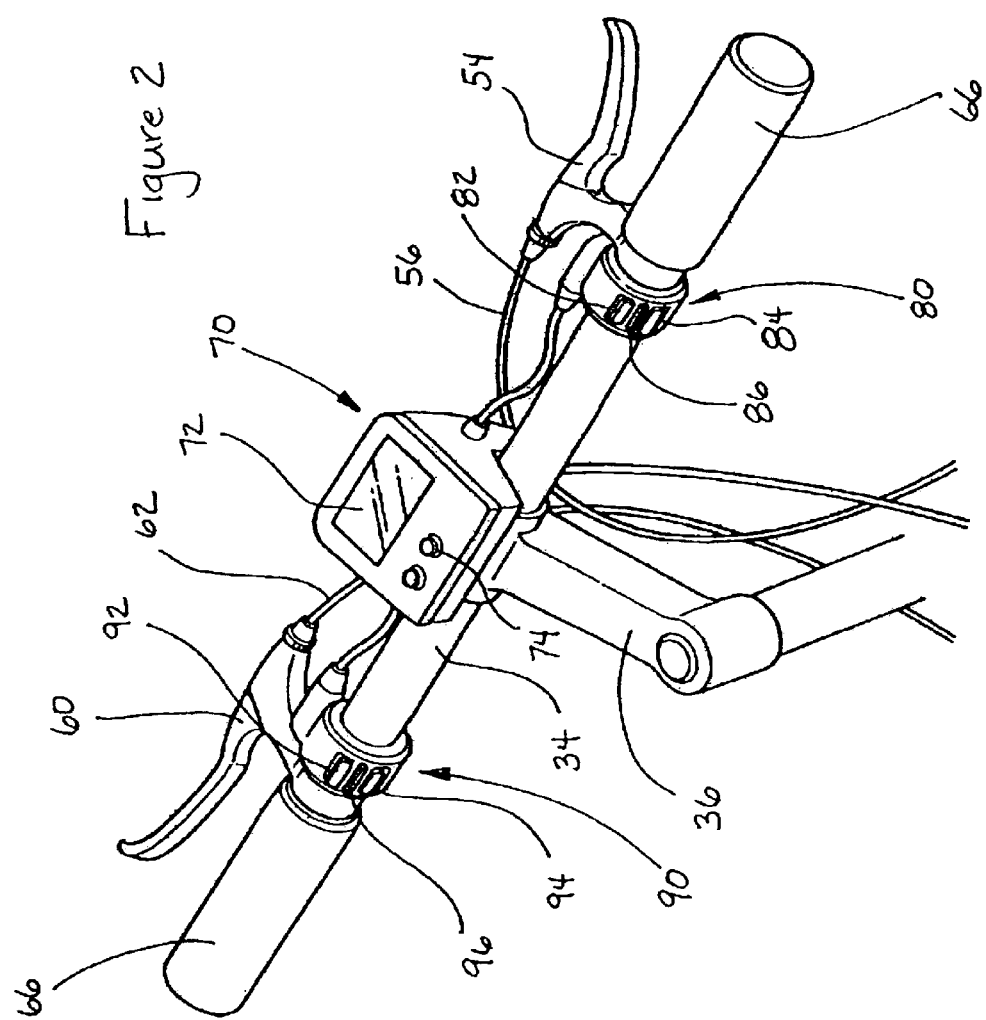
FIG. 2 is an enlarged perspective view of a handlebar region of the bicycle of FIG. 1.

The illustrated bicycle also features standard front brakes and rear brakes. As is known, a front brake lever 54 can be operated to pull a wire of a bowden-wire type of cable 56. As the wire is pulled, the front brakes are applied. In the illustrated arrangement, a clamping action about the front rim occurs at a front brake caliper 58. A similar arrangement also is used for the rear wheel 24 wherein a rear brake lever 60 is used to manipulate a cable 62 and a rear brake caliper 64. As illustrated in FIG. 2, the levers 54, 60 preferably are mounted proximate hand grips 66 formed on the handle bars 18.

With reference to FIG. 1, a control system 68 is attached to the bicycle. The control system 68 is adapted to carry out a number of functions that will be described below. In addition, the control system 68 is adapted to provide a variety of informational data to an operator of the bicycle during operation of the bicycle.

With reference again to FIG. 2, a display housing 70 is mounted to the bicycle 10 and forms a portion of the control system 68. The display housing 70 preferably is positioned to be easily viewed during operation of the bicycle 10. Preferably, the display housing 70 is mounted to either the frame assembly 12 or the front fork assembly 14/handle bar assembly 32. In the illustrated arrangement, the display housing 70 is mounted proximate an intersection between the stem 36 and the handle bars 34. Any suitable technique of mounting the display housing 70 can be used; however, a simple bracket is used in the illustrated arrangement. The bracket is secured to the handle bars 34 and/or stem 36.

The illustrated display housing 70 comprises a screen 72. The screen 72 can be used to display various operating parameters of the bicycle 10 and the associated transmission 24. The screen 72 can be slightly recessed within the display housing 70 and can be backlit if desired. The screen 72 can be mounted within the display housing 70 in any suitable manner and any suitable screen configuration can be used. The illustrated display housing 70 also comprises a power button 74. The power button 74 is preferably used to power up the control system 68.

Figure 3:
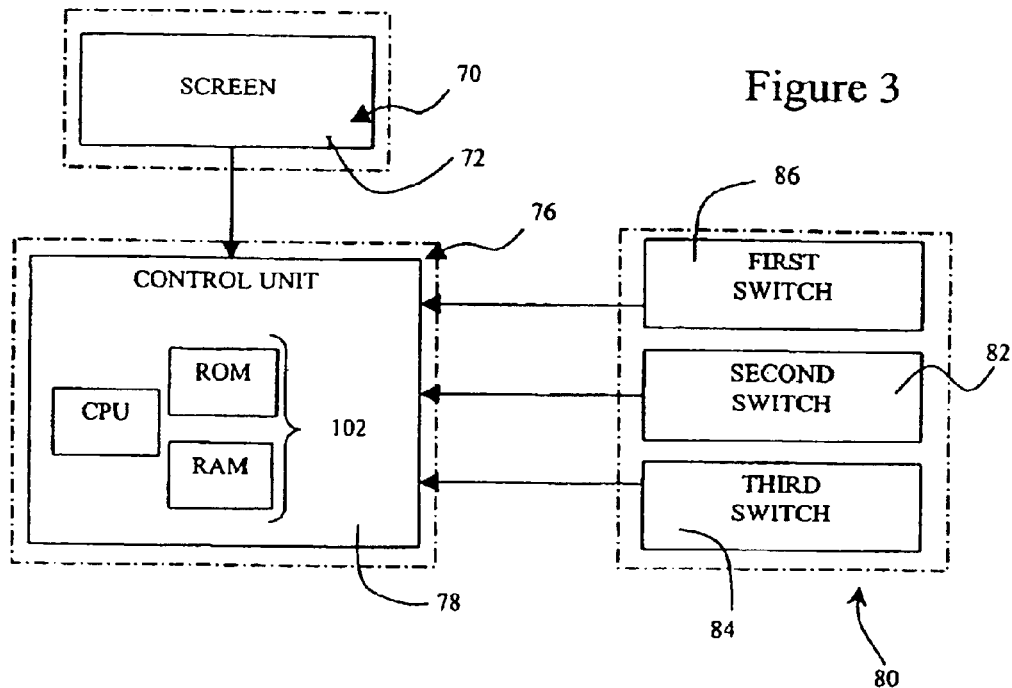
FIG. 3 is a schematic diagram of a control system having certain features, aspects and advantages in accordance with the present invention.

A control housing 76 preferably is mounted to a portion of the illustrated bicycle 10 and also forms a portion of the control system 68. In the illustrated arrangement, the control housing 76 is mounted to the downtube 18. The control housing 76 preferably defines a substantially enclosed chamber (not shown) that contains a control unit 78, which is schematically represented in FIG. 3. Preferably, the housing 76 provides an enclosed environment that protects the control unit 78 from dirt, dust, water and the like. In some arrangements, the control unit 78 is mounted within the control housing 76 in a manner that reduces the shocks transmitted to the control unit 78. In other arrangements, the control housing 76 is mounted to the frame assembly 12 in such a manner that shock transmission to the control housing 76 is reduced. Any suitable control housing 76 can be used.

With continued reference to FIG. 2, a first switch assembly 80 is mounted on a first side of the handle bar assembly 32. Preferably, the first switch assembly 80 is mounted adjacent to the right grip 66. In this manner, the first switch assembly 80 can be manipulated by a hand positioned on the right grip 66. The first switch assembly 80 is in electrical communication with the control unit 78. In one arrangement, the first switch assembly comprises three distinct push buttons: an up shift button 82, a down shift button 84 and a drive mode button 86. The up shift button 82 and the down shift button 84 are operably connected to the rear shifting device 50. In the presently preferred arrangement, the two buttons 82, 84 are connected to the rear shifting device 50 through the control unit 78. During manual operation, pressing the up shift button 82 will cause the rear shifting device 50 to up shift gears and pressing the down shift button 84 will cause the rear shifting device 50 to down shift gears.

Similarly, a second switch assembly 90 is mounted on a second side of the handle bar assembly 32. Preferably, the second switch assembly 90 is mounted adjacent to the left grip 66. In this manner, the second switch assembly 90 can be manipulated by a hand positioned on the left grip 66. The second switch assembly 90 is in electrical communication with the control unit 78. In one arrangement, the second switch assembly comprises three distinct push buttons: an up shift button 92, a down shift button 94 and a suspension mode button 96. The up shift button 92 and the down shift button 94 are operably connected to the front shifting device 52. In the presently preferred arrangement, the two buttons 92, 94 are connected to the front shifting device 52 through the control unit 78. During manual operation, pressing the up shift button 92 will cause the front shifting device 52 to up shift gears and pressing the down shift button 94 will cause the front shifting device 52 to down shift gears.

It should be noted that the switch assemblies 80, 90 can be reversed, moved to a different region of the handle bars 34 or moved to a different region of the frame assembly 12 altogether. In the illustrated arrangement, each of the switches of the switch assemblies 80, 90 are directly electrically connected to the control unit 78 through a set of wires (i.e., hard wired), it is anticipated that other types of electrical connections (i.e., infrared, radio waves, etc.) also can be used. In addition, while push buttons are used in the illustrated arrangement, other types of switches also are suitable and can be used.

The drive mode button 86 also is in electrical communication with the control unit 78. The drive mode button 86 allows an operator to select among distinct automatic and manual transmission modes. For instance, the drive mode button 86 allows an operator to chose among one or more automatic shifting scenarios or a manual shifting scenario. Thus, an operator can press the drive mode button 86 once to enter a manual operational mode, twice to enter a first automatic scenario and three times to enter a third automatic scenario, for example. Any number of automatic scenarios can be stored in the control unit 78. Such automatic shifting scenarios are described, for instance, in copending U.S. patent application Ser. No. 10/043,713, filed on Jan. 11, 2002 and assigned to the assignee of the present application, the disclosure of which is hereby incorporated by reference in its entirety.

The suspension mode button 96 is in electrical communication with the control unit 78. The suspension mode button 96 can be used to shift between various suspension operating conditions. For instance, pressing the button once may make the suspension stiff and pressing the button twice may make the suspension soft. Other variations also are possible.

The control unit 78 in the illustrated arrangement is electrically connected to a wheel rotation sensor 100 that is disposed to detect each revolution of a wheel of the bicycle 10. In the illustrated arrangement, the wheel rotation sensor 100 is mounted to the front fork assembly 26 proximate the front wheel 28; however, other locations, such as proximate the rear wheel 24, for example but without limitation, also can be used. The wheel revolution sensor 100 in the illustrated arrangement comprises an emitter and detector or a magnet and a detector. Other suitable arrangements also can be used.

The control unit 78 also can be connected to an audible alert device (not shown). The audible alert device can be integrated into the display housing 70 or the controller housing 76, if desired. In some arrangements, a separate audible tone generator can be used. The audible alert device can be a bell, buzzer, speaker or the like. Preferably, the audible alert device is used to warn an operator of an upcoming gear shift. For instance, an audible alert can be emitted about three seconds before a gear shift.

The illustrated control unit 78 receives input signals from the wheel rotation sensor 100, the position detectors (not shown), the shift switches 82, 84, 92 and 94, the power switch 74, the drive mode switch 86 and the suspension mode switch 96. The data is processed and output signals can be generated that are output to the screen 72, the rear shift device 50 and the front shift device 52.

The control unit 78 also includes a memory device 102 of any suitable type. In the illustrated arrangement, the memory device 102 stores a variety of data related to gear steps and operational speeds. The memory device 102 also preferably stores data relating to bicycle speed and distance covered. Furthermore, the memory device 102 preferably stores data relating tire size. In some arrangements, data representing time of use or actual time can be stored in the memory device 102. The memory device 102 can be read only or can be read-write in some applications. The read-write type of memory device 102 can be used to track various data, as desired by the operator.

Figure 4:
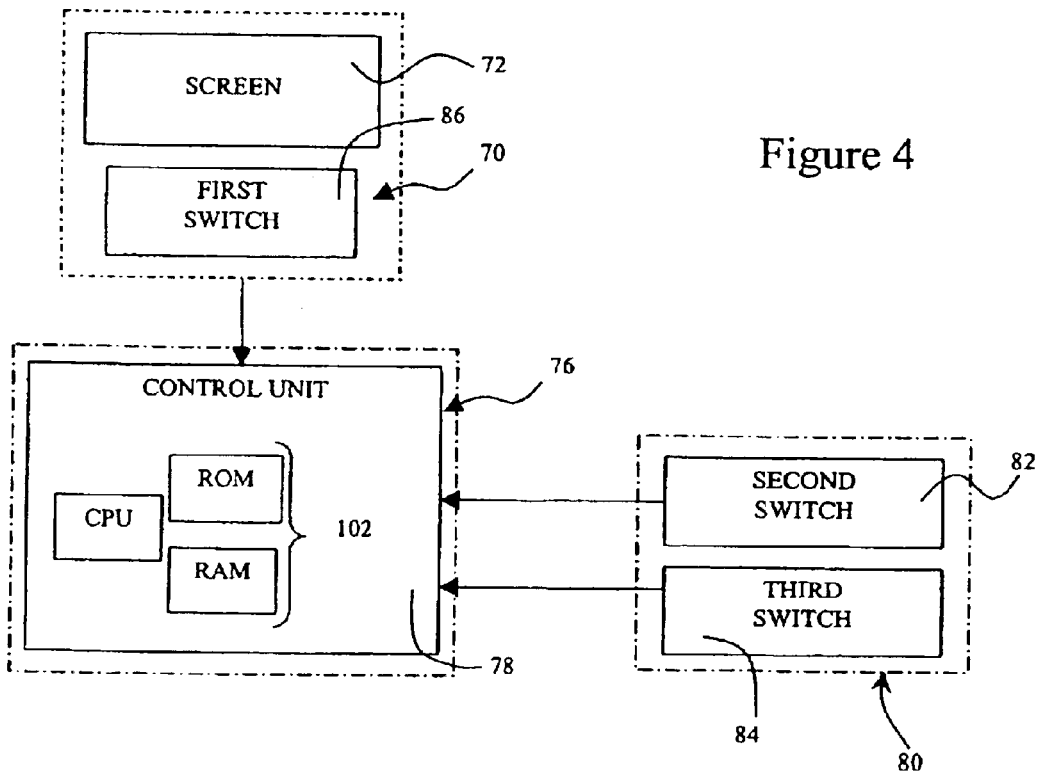
FIGS. 4–7 are schematic diagrams of other control system configurations having certain features, aspects and advantages in accordance with the present invention.
Figure 5:
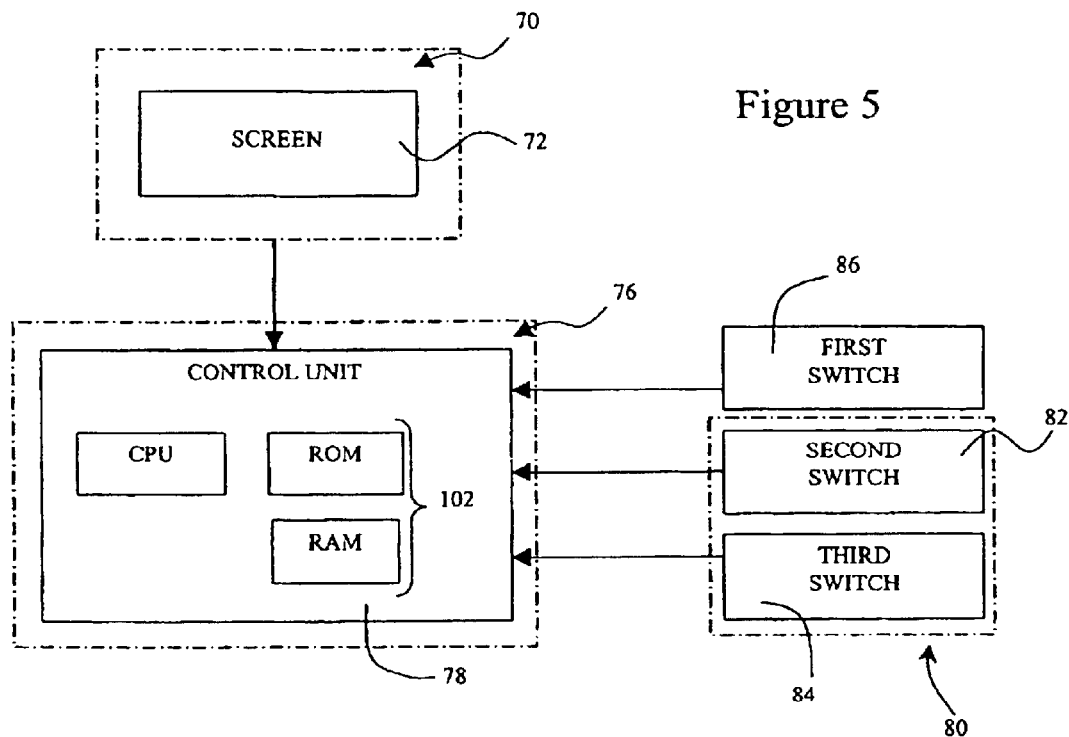
Figure 6:
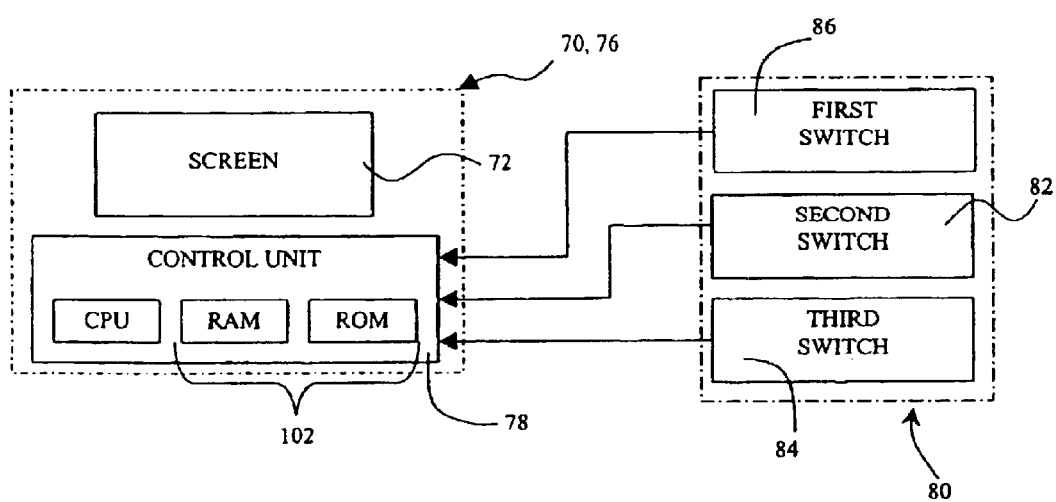

Various alternative configurations of the present control system are shown schematically in FIGS. 4–7. While not all of the available configurations have necessarily been presented in FIGS. 4–7, these four configurations are representative of some of the alternatives. In these various configurations, each of the elements has retained its reference numeral. For instance, element 70 is the display housing and element 76 is the control housing. The phantom lines indicate the two housings. In FIG. 6, the display housing and the control housing have been integrated into a single component and, thus, the single housing is identified by reference numerals 70, 76.

It should be noted that the three switches in each of these configurations are identified by the reference numerals associated with the first switch assembly 80; however, this is for ease of description only. The switches of the second switch assembly 90 also could be used. Moreover, by discussing only the switches of the first and second switch assembly, it is not meant to be inferred that other remote switches cannot be used. Any remote switch can be used as desired. By remote switches, it is meant switches that are not integrated into the display housing 70 or the control housing 76. At least one remote switch is used in each embodiment of the present invention. The remote switch can be used for switching among various informational readouts on the screen 70 and for setting or altering various information that is used by the control unit 78 and/or shown on the screen 70. In one particularly advantageous arrangement, the remote switch not only allows an operator to select an informational readout and to change a value on that readout, but the same remote switch allows an operator to manually shift gears on the bicycle.

With continued reference to FIGS. 4–7, the first switch in each of those figures is the drive mode button 86, the second switch is one of the rear up shift or down shift buttons 82, 84 and the third switch is the other of the rear up shift or down shift buttons 82, 84. As noted directly above, other embodiments can use other remotely positioned switches and other numbers of remotely positioned switches.

With reference first to FIG. 4, in this arrangement, the mode switch 86 has been integrated into the display housing 70 while the second and third switches 82, 84 are remotely positioned relative to both the display housing 70 and the control housing 76. With reference next to FIG. 5, the display housing 70 and the control housing 76 are remotely positioned relative to each other while the mode switch 86 is remotely positioned relative to the second and third switches 82, 84. In this arrangement, each of the switches is remotely positioned relative to both of the housings 70, 76.

Figure 7:
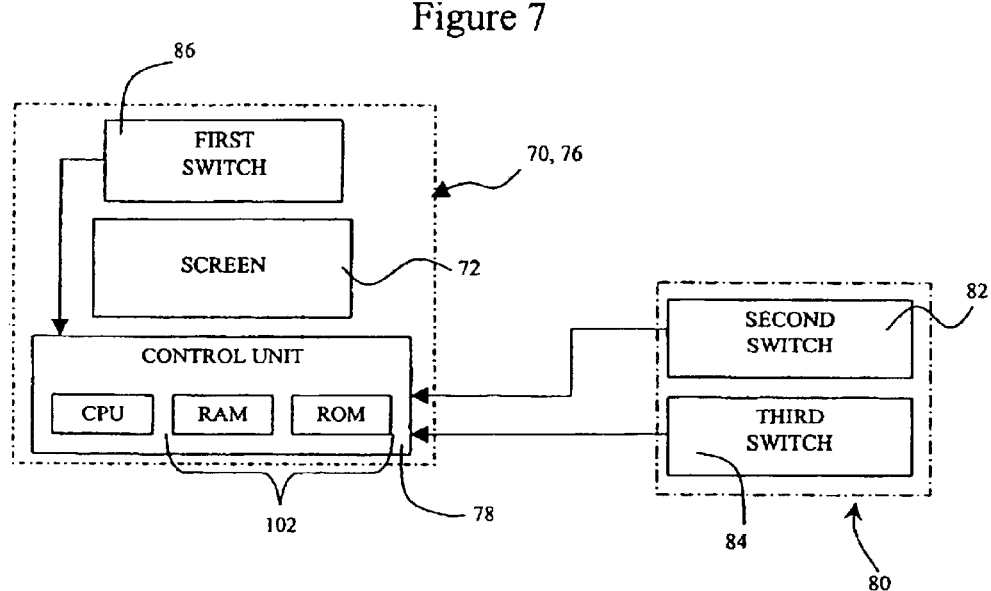

With reference to FIG. 6, the display housing 70 and the control housing 76 have been integrated into a single housing that contains both the control unit 78 and the screen 72. In this arrangement, the three switches are remotely positioned relative to the single housing 70, 76 and the three switches are integrated into a single component. With reference now to FIG. 7, the display housing 70, the control housing 76 and the switch assembly 80 have been integrated into a single component. Such an arrangement can be disposed adjacent to a handgrip with the display screen 72 being proximate the switches of the switch assembly 80. Thus, in this arrangement, the display housing 70, the control housing 76, the first switch 86, the second switch 82 and the third switch 84 are integrated. In such an arrangement, the first switch 86, which may be used as the mode switch 86, is not remotely positioned relative to the display housing 70 or the control housing 76. The shifting switches or the second and third switches 82, 84 preferably are used to set values in the controller and to control shifting of the gears of the bicycle. Advantageously, such a construction reduces the overall number of switches or push buttons used to operate both the computer and the bicycle. Other variations also are possible depending upon the desired characteristics of the control unit, the display and the switch assemblies.

Having described various component layouts, a control strategy will now be described with reference to FIG. 8. The following control strategies will be described in the context of a software implementation. It is envisioned that a hardware implementation also can be used. Thus, the process steps described herein preferably are implemented within software modules (programs) that are executed by one or more computer or central process unit (CPU). The software modules may be stored on or within any suitable computer-readable medium. It should be understood that the various steps may alternatively be implemented in-whole or in-part within specially designed hardware.

Figure 8:
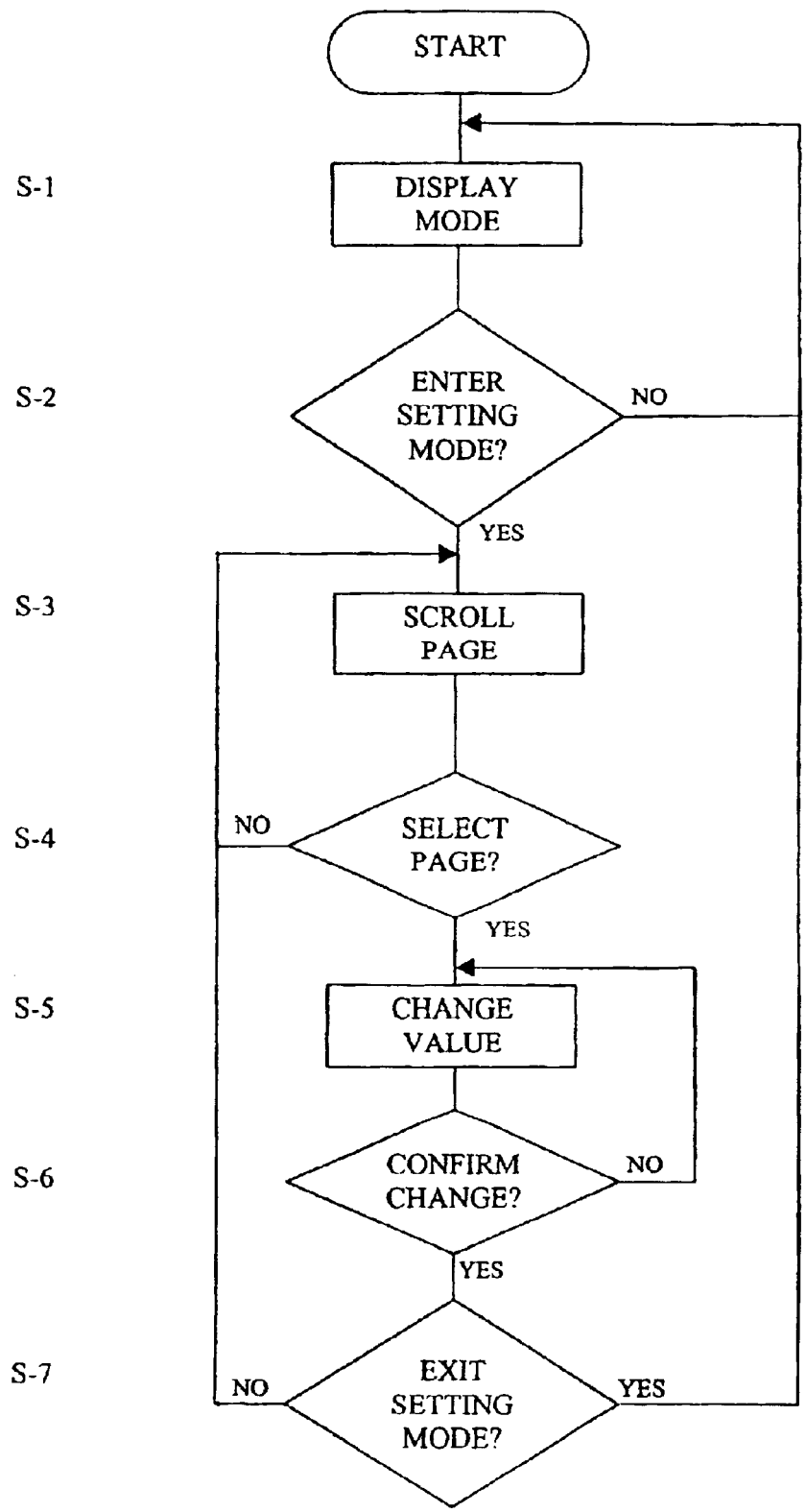
FIGS. 8 and 9 are flow charts of two routines arranged and configured in accordance with certain features, aspects and advantages of the present invention.

The control strategy illustrated in FIG. 8 allows an operator to review and change various values stored or accessed by the control unit 78 and displayed on the screen 72. During normal operation of the illustrated arrangements, the screen 72 typically is displaying operational information about the bicycle. See S-1. For instance, the screen 72 can be displaying the shift timing that is in use, the speed the bicycle is currently traveling, an overall average speed, a total distance traveled during the present operation or the overall distance traveled since the last value reset, the time of use, the time of day or the like.

The control unit 78 then awaits an indication that the operator wants to enter a value setting mode of control system operation. See S-2. Once the operator indicates such a desire, the control unit 78 presents the operator with a first informational content screen. If more than one informational content screen is provided, the operator can navigate through the various content screens. See S-3. Once the operator finds the screen on which the operator desires to change a value, the operator indicates that desire. See S-4. The operator then can alter a value on the selected screen. See S-5. Once the operator is satisfied with the changed value, the value is set by confirming the change. See S-6. The operator can continue this sequence (e.g., S-3 through S-5) until all of the values are satisfactory to the operator. The value setting mode is then exited. See S-7.

The use of remote switches (e.g., 82, 84, 86, 92, 94, 96) to scroll through the pages and change values advantageously enables an operator to move through any number of pages and alter any value without extended operation of the bicycle 10 with the hands removed from the grips 66. Thus, the likelihood of a loss of bicycle control during value changes can be greatly reduced.

In a first arrangement, the setting mode is entered (see S-2) by depressing a switch, such as the drive mode switch 86, for a preset period of time. The extended manipulation of the switch 86 allows the control unit 78 to distinguish between a desired change in drive mode (e.g., automatic 1, automatic 2, automatic 3 or manual) and a desired entry into the value setting mode. While the switch 86 used to enter the value setting mode preferably is remotely positioned relative to the control housing 76 and the display housing 70, it is anticipated that it can be mounted to either if desired because operation of the mode switch 86 is likely to occur rather infrequently and for a rather brief period of time. It is preferred, however, that the mode switch 86 also be positioned proximate the hand grips 66.

In this first arrangement, once the setting mode has been entered, various content screens are scrolled through using the upshift and downshift switches 82, 84. See S-3. In one presently preferred configuration, the following screens are provided: (1) buzzer control; (2) tire length entry; (3) measurement unit control; (3) shifting speed control; (4) trip distance reset; (5) total distance reset; and (6) clock control. The operator can continue to navigate through the content screens using the switches 82, 84.

When a value that the operator seeks to change is displayed on the screen 72, the operator can once again manipulate the mode switch 86. This manipulation moves the control unit into a value changing mode. See S-4. The value displayed then is altered using the up shift and down shift switches 82, 84. See S-5. For instance, if the length of the tire is shorter than displayed, the down shift switch 84 can be used to decrement the displayed value until it is correct. Similarly, the buzzer can be toggled on or off or the volume of the buzzer can be adjusted using the up shift switch 82 and the downshift switch 84. Other alterations can be as follows: switching between mile and kilometer or miles per hour and kilometer per hour in the measurement unit control content screen; increasing and decreasing the speeds at which shifting will occur (e.g., lowering the value causes automatic shifting to occur at lower speeds and raising the value causes automatic shifting to occur at higher speeds) in the shifting speed control content screen; selecting particular gears to omit or use during automatic shifting in a shifting sequence control content screen; resetting the stored data in the trip distance reset content screen and the total distance reset screen; and adjusting the time reading on the clock in the clock control content screen. Further content screens and adjustable values also can be used.

Once the desired change has been made to the value, the mode switch 86 can be used to lock the value for use by the control unit 78. See S-6. The content screens again can be scrolled at this stage. See S-3. The control system may also be programmed to automatically return to the scroll mode from the setting mode without adopting any changed values unless the operator performs an affirmative act (e.g., manipulates the mode switch 86). In other configurations, the control system may be programmed to adopt a change after a preset period of non-use by the operator (i.e., even if no affirmative act occurs).

In the first arrangement, the operator can manually return the control system to display mode once in scroll mode by manipulating the mode switch 86. See S-7 (YES). It also is desirable to allow the control system to automatically revert to display mode (see S-1) upon a preset period of non-use.

In another arrangement, the first switch is not used at all in the control sequence. Rather, in this second arrangement, the setting mode (see S-2) can be entered by either (1) operating one of the second switch 82 or the third switch 84 for a preset period of time (e.g., holding the switch down for a preset period of time) or (2) manipulating the second switch 82 and the third switch 84 simultaneously. Once in the setting mode, the routine described above according to the first arrangement can be carried out with either of the two options directly above being used in place of manipulating the mode switch 86. This arrangement is advantageous because the operator would not have to remove his or her hands from the hand grips 66 and one less switch is necessary in carrying out the sequence.

In yet another arrangement, the front up shift and down shift switches move one between display mode and setting mode, and scroll the screens while the rear up shift and down shift switches are used to alter values. The values are set when the front up shift or front down shift switch moves from one content screen to the next after a value has been changed by the rear up shift or rear down shift switch.

Figure 9:
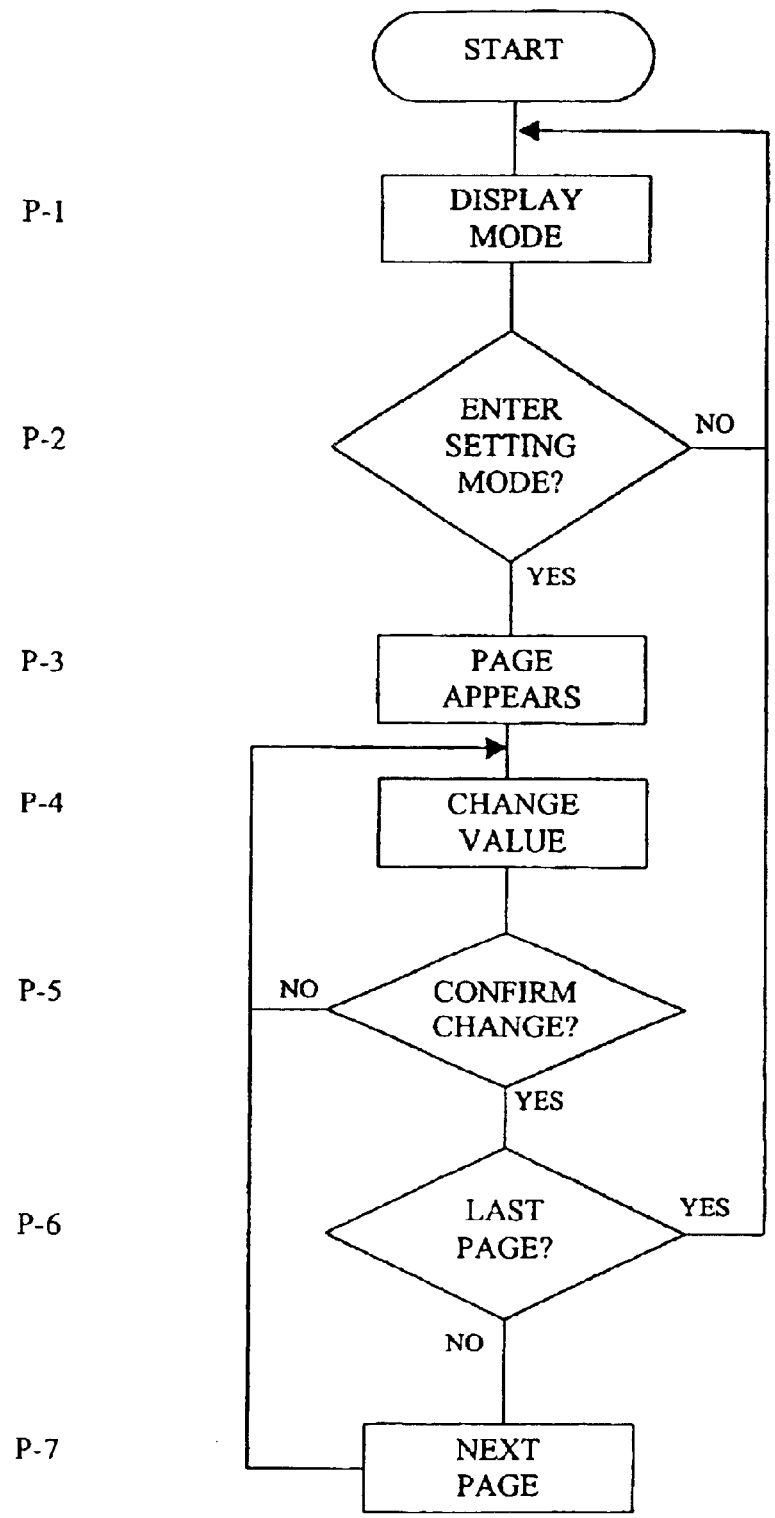

With reference now to FIG. 9, a further control strategy can be provided that allows a manufacturer, dealer or bicycle owner to perform an initial set-up of the control system. For instance, when the computer is first started, reset or otherwise used after an extended period of time without proper power, the memory can be loaded with initial values through this control strategy. As such, upon starting, the control unit 78 can be brought into the setting mode (see P-2) from the display mode (see P-1). As will be true for the remaining description, any of the switch manipulations described above can be used to transition from the setting mode to the display mode.

Once in the setting mode, a first screen is displayed. See P-3. A value is then entered as in the arrangements described above. See P-4. After the value has been entered, the user can confirm the change in any of the manners described above (e.g., affirmative action or waiting a preset period of time). See P-5.

The control system then continues to present content screens until the last content screen has been viewed and data entered. See P-6. After all of the content screens have been viewed and any desired data entered, the control routine returns to the display mode. See P-1. Normal operation of the control unit with the entered data then is begun.

Although the present invention has been described in terms of a certain embodiment, other embodiments apparent to those of ordinary skill in the art also are within the scope of this invention. For instance, a single switch can be used to perform each of the steps of the sequence described above. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A method of controlling a control unit of a bicycle during operation of the bicycle, the bicycle comprising a first switch, a second switch, a third switch and a screen in communication with said control unit, said control unit including at least one memory device, said second switch and said third switch being remotely positioned relative to said screen, each of said first switch, said second switch and said third switch being in communication with said control unit and being disposed for actuation by a rider of the bicycle during operation, said method of controlling comprising:

selecting an operation mode with one of said first, second, and third switches;

selecting a value setting mode for altering a value stored in said memory device, with at least one of said first, second, and third switches; and altering a value in said memory device displayed on said screen with at least one of said second switch and said third switch.

2. The method of claim 1 further comprising confirming said altered value with at least one of said first, second, and third switches.

3. The method of claim 2 further comprising selecting a content screen with at least one of said second switch and said third switch after said value setting mode has been selected.

4. The method of claim 3, wherein said selected content screen is selected from the group consisting of a shift warning buzzer activation screen, a tire length adjustment screen, a unit selection screen, a shifting speed variation screen, a trip odometer screen, a general odometer screen and a time display screen.

5. The method of claim 4, wherein each screen in the group is displayed in seriatim by operation of at least one of said second switch and said third switch.

6. The method of claim 3, wherein said content screen displays a preset shifting indicator and said value increases or decreases said shifting indicator such that a speed at which automatic shifting occurs is increased or decreased.

7. The method of claim 1, wherein said bicycle further comprises a powered shifting device that is in electrical communication with said control unit, said selecting an operation mode step further comprises controlling said powered shifting device with said second switch and said third switch.

8. The method of claim 1, wherein said value setting mode is selected when said first switch is manipulated for a preset period of time.

9. A method of controlling a control unit of a bicycle during operation of the bicycle, the bicycle comprising a first switch, a second switch and a screen in communication with said control unit, said control unit including at least one memory device, said second switch being remotely positioned relative to said screen, said first and second switches being disposed such that a rider of the bicycle can actuate said first and second switches while riding the bicycle, each of said first switch and said second switch being in communication with said control unit, said method of controlling comprising:

selecting an operation mode with said first switch;

selecting a value setting mode with at least one of said first switch and said second switch; and altering a value on said screen with at least one of said first switch and said second switch.

10. The method of claim 9 further comprising selecting a content screen with at least one of said first switch and said second switch after said value setting mode has been selected.

11. The method of claim 10 further comprising confirming said altered value by manipulating said first switch and said second switch simultaneously.

12. The method of claim 10, wherein said bicycle further comprises a powered shifting device that is in electrical communication with said control unit, said method further comprising controlling said powered shifting device with at least one of said first switch and said second switch.

13. The method of claim 9, wherein said value setting mode is selected when one of said first switch and said second switch is manipulated for a preset period of time.

14. The method of claim 9, wherein said value setting mode is selected when said first switch and said second switch are manipulated simultaneously.

15. An electrical auto-shift bicycle comprising a control unit including a memory device, a powered shifting device, said control unit being in electrical communication with said powered shifting device, a first switch and a second switch being remotely positioned relative to said control unit and being in communication with said powered shifting device though said control unit, a mode switch in electrical communication with said control unit, said mode switch being adapted to switch said control unit between a plurality of operation modes, said first switch and said second switch being adapted to initiate movement of said powered shifting device, said first switch, said second switch, and said mode switch being disposed for actuation by a rider riding the bicycle, said control unit being configured to enter a data entry mode when at least one of the first switch, second switch, and mode switch is actuated by a rider of the bicycle, said first switch and said second switch being adapted to alter a value stored in the memory device of said control unit.

16. The bicycle of claim 15, wherein said first switch and said second switches are adapted to initiate up-shifting movement and downshifting movement of said powered shifting device.

17. The bicycle of claim 15, wherein said second switch comprises three positions such that said second switch can initiate up-shifting movement and downshifting movement.

* * * * *